United States Patent
Hinkel

[19]

[11] Patent Number: 6,116,115
[45] Date of Patent: Sep. 12, 2000

[54] CONVERTER HOUSING OF A HYDRODYNAMIC TORQUE CONVERTER WITH A DRIVER

[75] Inventor: Rüdiger Hinkel, Heidenfeld, Germany

[73] Assignee: Mannesmann Sachs AG, Schweinfurt, Germany

[21] Appl. No.: 09/184,194

[22] Filed: Nov. 2, 1998

[30] Foreign Application Priority Data

Oct. 31, 1997 [DE] Germany ............... 197 48 184

[51] Int. Cl.[7] ............................................. F16H 57/02
[52] U.S. Cl. ................................................. 74/606 R
[58] Field of Search ..................................... 74/606 R

[56] References Cited

U.S. PATENT DOCUMENTS

| | | |
|---|---|---|
| 4,027,757 | 6/1977 | Radke et al. . |
| 4,138,003 | 2/1979 | Malloy . |
| 4,177,885 | 12/1979 | Ross . |
| 4,502,279 | 3/1985 | Fuehrer ................... 74/606 R |
| 4,580,668 | 4/1986 | Pickard et al. . |
| 4,588,058 | 5/1986 | Aliouate . |
| 4,689,954 | 9/1987 | Billet . |
| 4,951,467 | 8/1990 | Walsh et al. ............... 74/606 R |
| 5,172,608 | 12/1992 | Schultz et al. . |
| 5,810,140 | 9/1998 | Billet et al. . |

FOREIGN PATENT DOCUMENTS

| | | |
|---|---|---|
| 561 428 | 10/1923 | France . |
| 2 335 748 | 7/1977 | France . |
| 2 533 991 | 4/1984 | France . |
| 2 721 084 | 12/1995 | France . |
| 195 09 501 | 9/1996 | Germany . |
| 195 80 720 | 10/1996 | Germany . |
| 2 293 218 | 3/1996 | United Kingdom . |
| WO 97/01047 | 1/1997 | WIPO . |

OTHER PUBLICATIONS

German article entitled "Drehmomentwandler mit Überbrückungskupplung der heutigen Personenwagen–Automatikgetriebe" by Joachim Gimmler taken from ATZ Automobiltechnische Zeitschrift 88 dated 1986, pp. 81–87.

*Primary Examiner*—Mary Ann Battista
*Attorney, Agent, or Firm*—Cohen, Pontani, Lieberman & Pavane

[57] ABSTRACT

A converter housing of a hydrodynamic torque converter with a driver, is formed with a converter cover which is rotatable about a center axis. The driver is arranged at a side of the cover facing a drive in an area preferably extending substantially radially. The driver is in an operative connection with a receptacle of a drive element which is associated with the drive and having a center axis aligned with that of the converter cover. The driver has a platform which is fastened to the converter cover at a predetermined radial distance to the center axis of the converter cover without consideration of the radial distance of the receptacle of the drive element from the center axis of the drive element. At a side of the driver remote from the converter cover, a driver member projects in the direction of the drive element. The radial position of the driver member at the platform is determined so that its radial distance to the center axis of the converter cover corresponds to the radial distance of the receptacle from the center axis of the drive element.

11 Claims, 5 Drawing Sheets

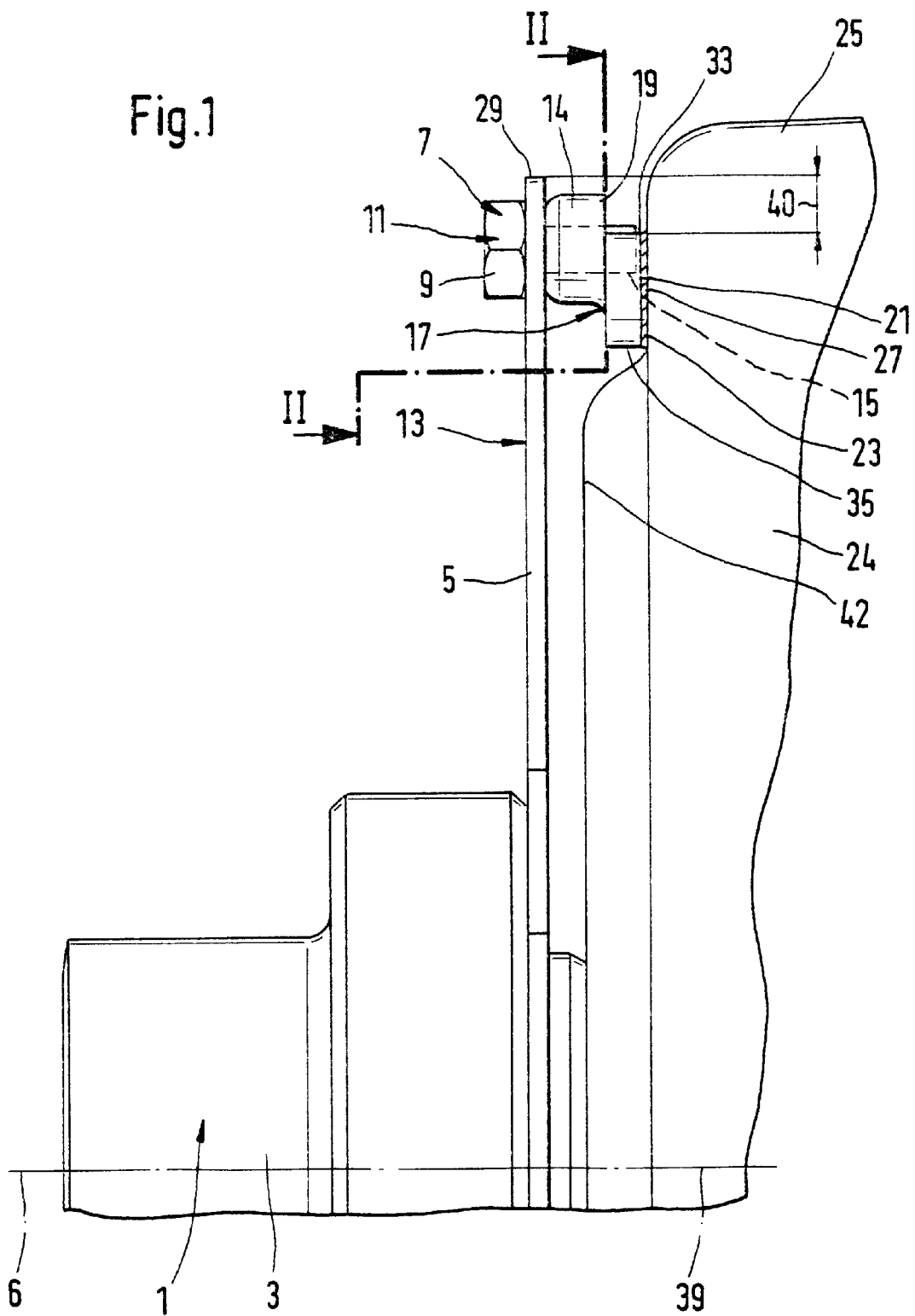

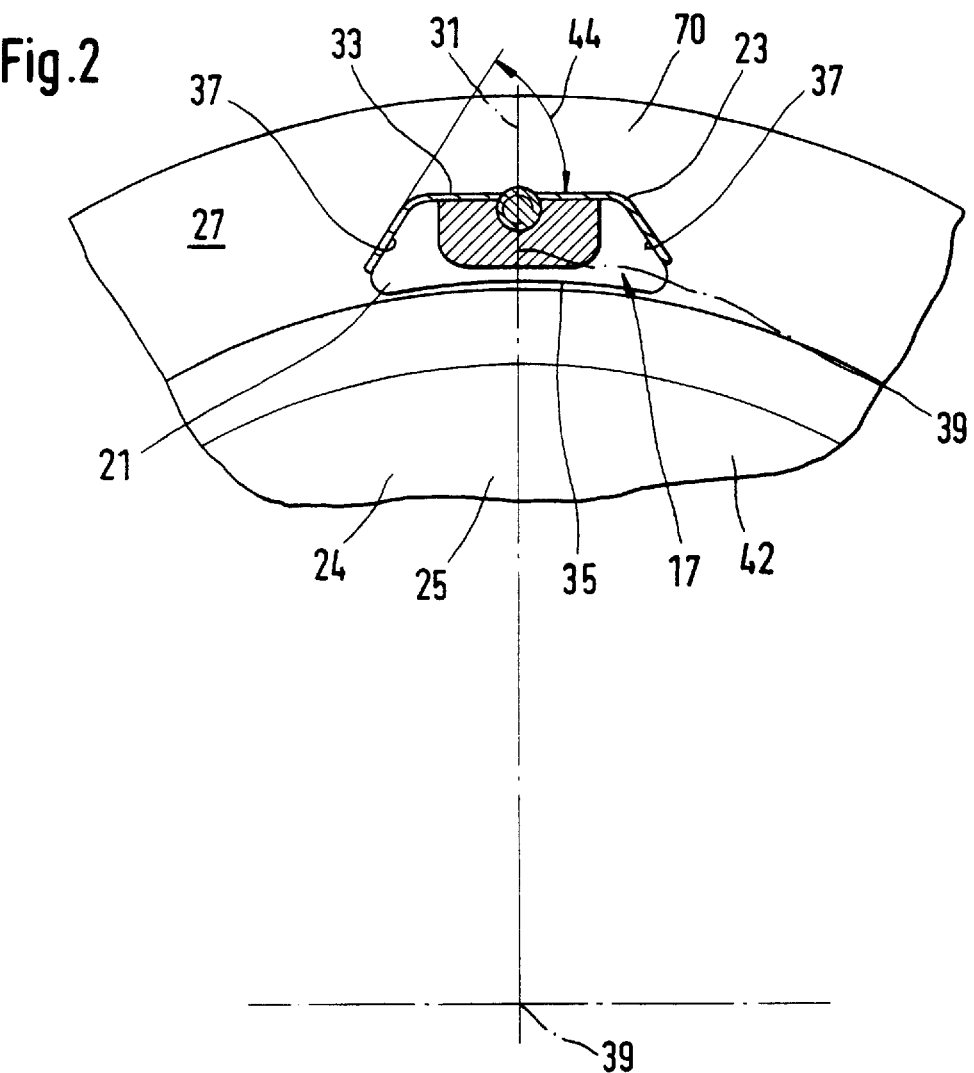
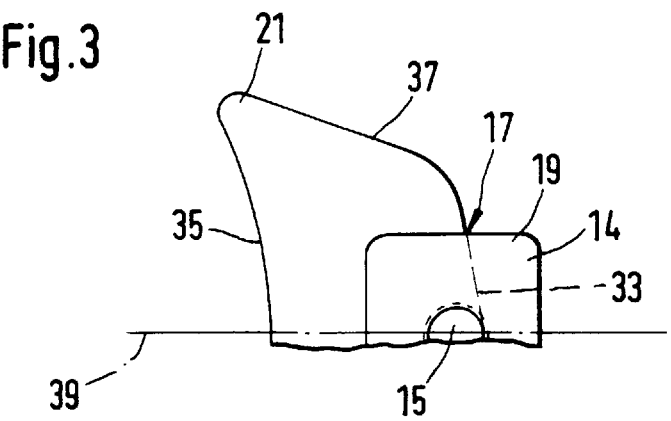

CONVERTER HOUSING OF A HYDRODYNAMIC TORQUE CONVERTER WITH A DRIVER

BACKGROUND OF THE INVENTION

1. Field of the Invention

The present invention is directed to a converter housing of a hydrodynamic torque converter with a driver. The driver is in operative connection with a receptacle of a drive element.

2. Description of the Related Art

German reference DE 195 09 501 A1 describes a converter housing of a hydrodynamic torque converter with a converter cover which is rotatable about a center axis. Drivers arranged at a side of the housing facing a drive, e.g., a crankshaft of an internal combustion engine, are distributed at regular angular intervals along the circumference of the housing at a preferably substantially radially extending region. The drives are intended for entering into an operative connection with a receptacle, not shown, of a drive element which is associated with the drive and has a center axis aligned with that of the converter cover. For this purpose, the driver has a block with a threaded bore hole in which a screw associated with the drive element can be inserted, the screw serving as a seat or receptacle for the driver.

In drivers of the type mentioned above which are fastened to the converter cover, the following problem arises: Each motor vehicle manufacturer provides the drive element which must be fixedly connected with the converter housing on an acceptable radius with the receptacles that are associated with the drivers fastened to the converter cover. Consequently, a converter manufacturer who produces torque converters for a number of motor vehicle manufacturers confronts the problem that the drivers used in the vehicles of every motor vehicle manufacturer, in some cases even for different engine types of the same motor vehicle manufacturer, must be arranged at a different radial distance from the axis of rotation of the converter housing, so that the required connection can be made to the receptacles of the drive element. This results in the problem that the drivers must be fastened to frequently varying radial regions of the converter cover, which is usually accomplished by welding. When the driver has a circular shape, for example, the driver may be fastened at its radial inner region to an axial formation at the converter cover, wherein an axial formation of this type can be provided, for example, to afford axial space for the installation of a torsional vibration damper. As a result, a radial displacement of the driver is insufficient, and the driver must be reconfigured, for example, in that its side facing the axial offset is constructed with a cutout for the axial offset. Ultimately, this requires a large number of different drivers which, in turn, has the result that a welding program for fastening the drivers to the converter cover must not only be changed with respect to position coordinates, but must be completely revised due to the new configuration of the driver. Further, considerable problems result when the welding tools cannot access determined locations of the converter cover, such as in a radial region of the axial offset, so that it is not possible to weld the driver in this region even when this is necessary.

SUMMARY OF THE INVENTION

It is the object of the present invention to provide a driver at a converter housing of a hydrodynamic torque converter in such a way that the driver is fitted in the same radial position of a converter cover. Advantageously the same welding program is used regardless of the specifications of the motor vehicle manufacturer with respect to a drive side.

The driver includes a platform for attachment to the converter housing and a driver member in an operative connection with a receptacle of a corresponding drive element. The platform is fastened to the converter cover at the same radial distance from a center axis of the converter cover, so that it is not necessary to exchange the platform or to change its position. Therefore, the same welding program is always used for this purpose. As will be described more fully hereinafter, the dimensions, the shaping and the positioning of the platform at the converter cover are selected to enable welding tools to always reach intended walls of the platform, so that it is extremely easy to fasten the driver to the converter housing.

When fastened to the converter cover in the manner described above, the platform serves to receive the driver member which projects in the direction of the drive element on a side of the platform remote from the converter cover. The radial position of the driver member is secured to the platform so that its radial distance from the center axis of the converter cover corresponds to the radial distance of the receptacle at the drive element from the center axis. Thus, the radial position of the driver member is advantageously shifted relative to the platform.

A tool for producing the driver has two tool halves, each of which has a filling chamber, wherein one filling chamber is provided for the platform and the other filling chamber is provided for the driver member. The two tool halves are displaced relative to one another along a common contact zone by which the filling chambers come into an operative connection with one another, such that a desired radial distance of the driver member is adjusted relative to a predetermined point of the platform. Subsequently, a material blank is inserted into the filling chambers. The blank is provided with a shape predetermined by the filling chambers in the tool halves, preferably by means of cold forming, by generating a contact pressure force of the two tool halves relative to one another. Depending on alignment of the two tool halves relative to one another, the driver member can project over a radial outer wall of the platform, project over a radial inner wall of the platform, or lie within a region of extension of the platform. Due to the fact that the two tool halves are displaceable relative to one another, any drivers can be produced. Apart from a one-time relative displacement of the two tool halves with respect to one another at the start of a new series production, there is no extra expenditure for the production of the drivers compared with tool halves which are positioned in a fixed manner relative to one another.

The drivers produced in this manner are subsequently arranged on a radial region of the converter cover intended for this purpose, preferably by means of a weld. The selection of the radial region is performed in the following manner.

Motor vehicle manufacturers specify different enveloping circles for different engines, each of the enveloping circles indicates the maximum diameter of the drive element provided by the motor vehicle manufacturer. In order to be able to use the driver according to the present invention in an engine with the smallest diameter at the transmission housing, and therefore the smallest enveloping circle, the driver is offset toward the radial inside by a predetermined distance from the enveloping circle. The predetermined distance is given, for example, by the thickness of the weld for fastening the driver to the converter cover, so that the weld does not run beyond the radial region given by the enveloping circle. This makes it possible in every instance to accommodate the converter housing with the drivers according to the present invention in any transmission housing.

Proceeding from the above-mentioned position, the platform extends radially inward, limited by an axial offset in the radial center region of the converter cover, for example, in order to arrange a torsional vibration damper within the converter housing. To ensure sufficiently large dimensions in the radial direction of the platform, however, the radial outer wall and radial inner wall of the platform are preferably adapted in shape to the associated radius. The radial inner wall of the platform is preferably larger in the circumferential direction than the radial outer wall, so that, lateral connecting walls extend at a predetermined angle. As a result, the lateral connecting walls are also aligned in such a way that a welding tool approaching from the radial outside can be applied to the converter housing with excellent results in order to form the desired weld. Since the weld preferably extends along both connecting walls and also along the radial outer wall of the platform, the platform is connected to the converter cover with sufficient strength even when no weld is provided at the radial inner wall of the platform. Consequently, the platform is lengthened even further radially inward by a distance that is required for a weld, so that the size of the radial region in which the driver member is positioned on the platform is as large as possible. Since the driver member projects still farther radially relative to the platform, both on the radial inside and radial outside, it is possible for the driver to be selected so as to fit all the receptacles of the drive element within a relatively large radial arrangement area. However, if this method of adapting is still not sufficient, the platform is additionally displaced toward the radial outside or radial inside insofar as the receiving area at the converter cover provided for receiving the driver is constructed in a flat manner of sufficient radial magnitude.

Due to the above-described advantageous construction of the platform having the outer wall and the inner wall adapted to radii, the platform is shifted radially without the need to change its construction. Consequently, with respect to the weld for fastening the platform and, therefore, the driver to the converter cover, only position coordinates need be changed, in order to adapt the welding program, but it is not necessary to develop a modified welding program. Even in this extreme case, the expenditure on manufacturing for adapting the position of a driver to the corresponding receptacle of a drive element is minimal.

To facilitate the connection of the platform to the converter cover, a projection in the form of a bead or bulge is preferably formed at a side of the platform facing the converter cover. After positioning the platform at the converter cover, electrical current is applied to the platform so that the projection softens in the direction of the converter cover, accompanied by simultaneous action of contact pressing force on the platform, so as to enable the platform to be temporarily basted or tacked to the converter cover. The actual weld is then formed at the platform along the radial outer wall and the lateral connecting walls without the risk of slippage of the platform.

The invention will be described in more detail hereinafter with reference to the drawings.

BRIEF DESCRIPTION OF THE DRAWINGS

In the drawings:

FIG. 1 shows an upper half of a connection of a converter cover of a converter housing of a hydrodynamic torque converter with a drive element of a drive, according to the present invention;

FIG. 2 is a sectional view of the connection according to section line II—II in FIG. 1;

FIG. 3 is a detail showing half of a driver producing the connection in FIGS. 1 and 2, in which a driver member projects over the radial outer wall of a platform;

DETAILED DESCRIPTION OF THE PRESENTLY PREFERRED EMBODIMENTS

Figure 4:
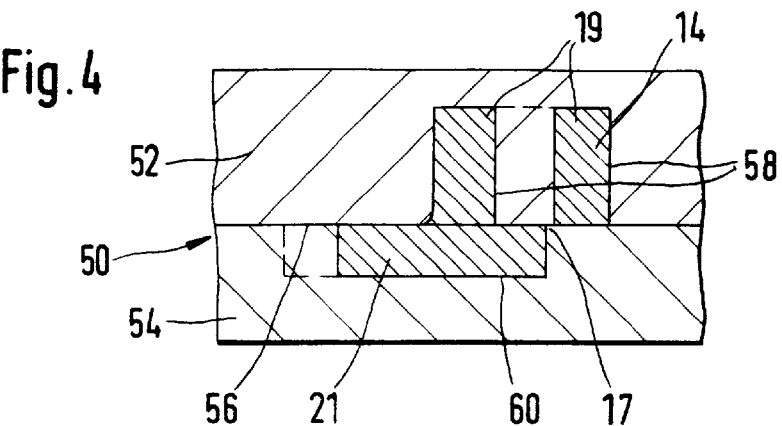
FIG. 4 shows a tool for producing the driver according to FIG. 3.

FIG. 1 shows a drive 1, for example a crankshaft 3 such as is used in an internal combustion engine. A flexible plate 5 which extends radially outward is provided at the crankshaft 3 or, if the crankshaft is constructed so as to be thicker in the axial direction, a flywheel is provided at the crankshaft. The flexible plate 5 or flywheel is rotatable about a center axis 6 and serves as a drive element 13. As can be seen in the present embodiment the drive element 13 has through-openings in a radial outer region for screws 9 which engage in a threaded bore hole 15 of a block 14. The block 14 serves as a driver member 19 of a driver 17. A platform 21 is constructed integral with the driver member 19 and is fastened to a converter cover 24 of a converter housing 25 by means of a weld 23. The screw 9 serves as a receptacle 11 for the driver member 19 of the driver 17. A torque delivered to the drive element 13 at the crankshaft 3 is thereby transmitted to the converter cover 24 and accordingly to the converter housing 25 which is rotatable about a center axis 39. The center axis 39 of the converter cover 24 is aligned with the center axis 6 of the drive 1.

The arrangement of the weld 23 and the construction of the platform 21 can be seen more clearly in FIG. 2. The platform 21 has a symmetrical construction relative to a center line 31 along the radial direction. The platform 21 has a radial outer wall 33, a radial inner wall 35 and, on both sides of the center line 31, connecting walls 37, extending at an angle 44 relative to the center line 31. The weld 23 is produced along both connecting walls 37 and along the radial outer wall 33 and accordingly is easily reached from the radial outside by welding tools. Due to the length of the weld for connecting the platform 21 to the converter cover 24, it is not necessary to weld along the radial inner wall 35 of the platform 21 which is relatively difficult to reach with the welding tool. The radial outer wall 33 and the radial inner wall 35 are essentially adapted with respect to their shape to the adjacent radii at the converter cover 24, wherein the radial inner wall in particular is adapted to the radius of an axial offset 42 extending radially inside. The axial offset 42, which can clearly be seen in FIG. 1, is formed, for example, when structural component parts such as a piston of a lockup clutch or a torsional vibration damper are to be arranged in a radial area within the converter housing 25. Since it is not necessary to form a weld along the radial inner wall 35 of the platform 21 and the shape of the inner wall is adapted to the radius of the axial offset 42 located in the radial inside, the platform can be displaced radially inward along a substantially flat receiving area 70 of the converter cover 24 until the radial inner wall 35 directly contacts the axial offset 42.

A radial area 27 is provided at the radial outside for receiving the platform 21. The radial area 27 is defined by an enveloping circle conforming to a greatest radial extension of the drive element 13. When the driver 17 is used in connection with different drive elements 13, i.e., when the receptacles 11 are formed with different radial distances to the center axes 6, 39, the platform 21 is preferably positioned at the converter cover 24 so that the radial outer wall 33 is situated radially within the smallest possible enveloping circle 29 by a distance that is predetermined. The distance is essentially given by the thickness of the weld 23, so that the platform 21, including the weld 23 for the connection to the converter cover 24, does not extend radially beyond the enveloping circle 29. Therefore, the platform 21 is mounted in a position in which it is easily accommodated to the smallest enveloping circle 29 and, usually as a consequence thereof, in the smallest transmission housing produced by the motor vehicle manufacturer. In this position, the platform 21 is fastened using the above-mentioned weld 23, without having to take into account the radial position of the receptacle 11 at the drive element 13.

Figure 5:
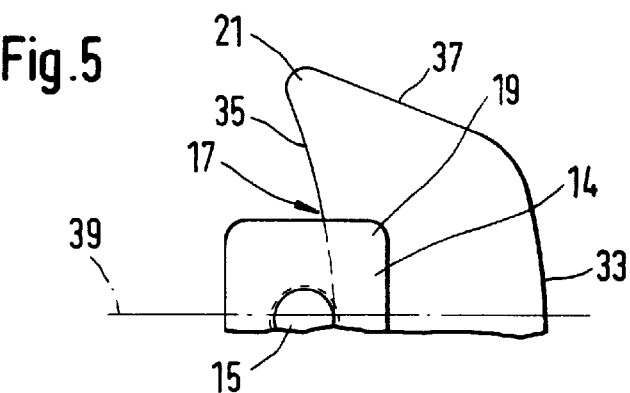
FIG. 5 is similar to FIG. 3 but shows the driver member projecting beyond the radial inner wall of the platform.

In order to produce a connection between the driver 17 and receptacle 11 of the drive element 13, the driver member 19 at the driver 17 is positioned according to FIG. 1 so as to project axially beyond the radial outside of the platform 21. FIG. 3 shows such a detail of the driver 17, in a half-view. However, when the receptacle 11 is arranged on a smaller diameter, the driver member 19 is provided radially between the outer wall 33 and the inner wall 35 of the platform 21 with the same arrangement location of the platform 21 at the converter cover 24, or, as is shown in FIG. 5, so as to project radially inward over the radial inner wall 35 of the platform 21. A radial offset of the receptacle 11 relative to the platform 21 is formed caused by positioning of the driver member 19 at the platform 21, wherein the two parts of the driver 17, that is, the driver member 19 and platform 21, are produced so as to form one piece, in the following manner.

Figure 6:
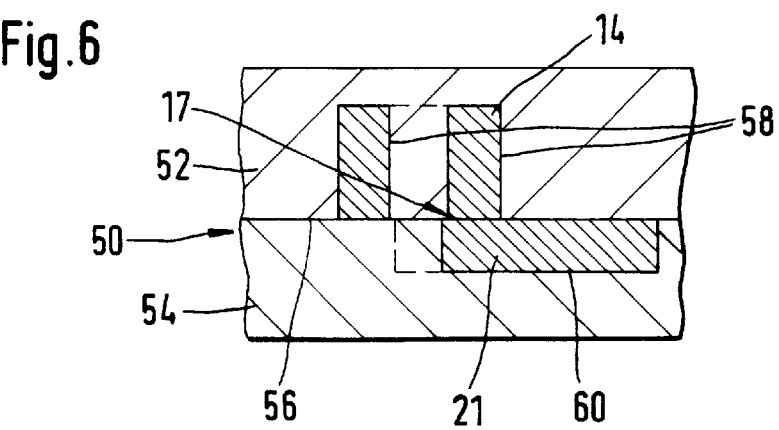
FIG. 6 shows a tool for producing the driver according to FIG. 5.

As can be seen more clearly in FIG. 4, a tool 50 has an upper tool part 52 and a lower tool part 54 which are movable not only in conventional manner in a direction vertical to the contact zone 56, but also parallel to the contact zone 56. In this way, at the start of the series manufacture for new drivers 17, the two tool halves 52, 54 are displaced relative to one another along the contact zone 56 until a desired relative position between a lower filling chamber 58 in the upper tool part 52 and a filling chamber 60 in the lower tool part 54. The two tool parts 52, 54 are then moved away from one another and a blank, not shown explicitly, is introduced into the lower filling chamber 60. Subsequently, the two tool halves 52, 54 are moved together accompanied by application of pressing force until they contact one another so as to deform the blank, preferably by means of a cold pressing process, or by means of a cutting process, so that the blank is forced into the two filling chambers 58, 60 and is thereby shaped. The driver 17 such as is shown in FIG. 3 is formed in this way when the two tool halves 52, 54 are in alignment as shown in FIG. 4, wherein the driver member 19 projects radially over the radial outer wall 33 of the platform 21. Conversely, an alignment of the two tool halves 52, 54 according to FIG. 6 leads to a construction of the driver 17 according to FIG. 5 wherein the driver member 19 projects radially over the radial inner wall 35 of the platform 21. As soon as the driver 17 is formed, the two tool halves 52, 54 are drawn apart again and accordingly release the driver 17. The driver 17 is then positioned in the radial region 27 of the receptacle area 70 at the converter cover 24 provided for this purpose, wherein an effect shown in FIGS. 7 and 8 is preferably utilized, this effect will be described below.

Figure 7:
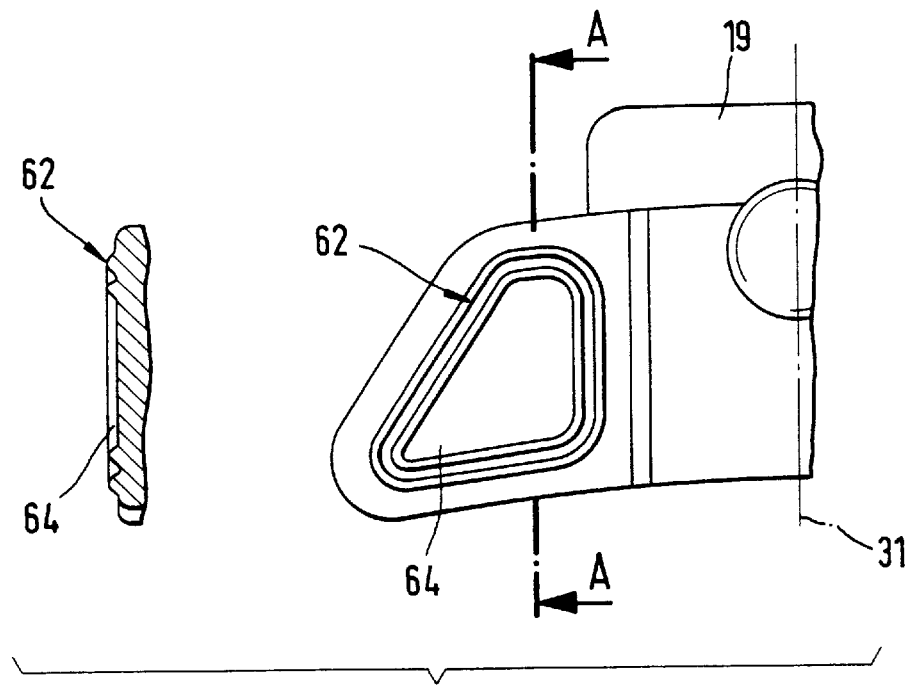
FIG. 7 shows the driver with a view of a side facing the converter cover having a projection which is formed by a bead, and a lateral sectional view of this projection.
Figure 8:
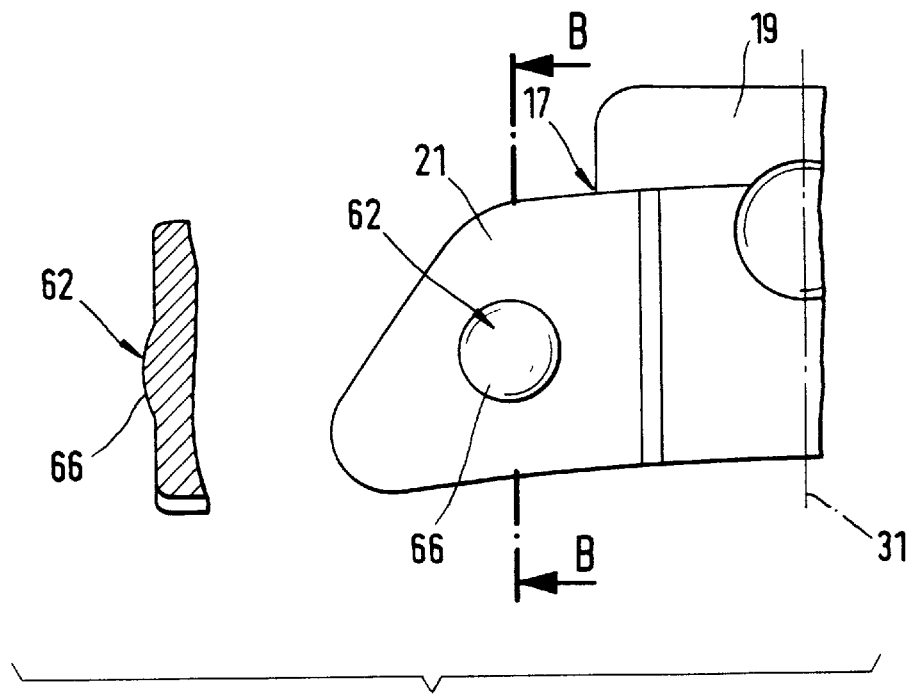
FIG. 8 is similar to FIG. 7 but having the projection formed as a bulge.

At a side of the platform 21 facing the converter cover 24, a projection 62 is provided which, according to FIG. 7, is constructed as a bead 64 extending substantially parallel to the walls 33, 35, 37 of the platform 21, at least along a portion of its length. According to FIG. 8, the projection 62 is formed by at least one bulge 66. By applying electrical current to the platform 21, the respective projection 62 melts, so that the platform 21 is tacked to the converter cover 24 accompanied by simultaneous application of pressure via the projection 21 in the direction of the converter cover 24. With a preliminary fastening of this kind, the final weld 23 is subsequently produced for fastening the platform 21 to the converter cover 24. The final weld 23 is preferably produced by means of shielded arc welding or laser welding.

In the embodiment described above, the connection between the drive element 13 and the converter cover 24 is formed by means of the block 14 at the driver 17, while the receptacle 11 at the drive element 13 is formed by a fastening element 7. In another embodiment according to FIG. 9, the driver member 19 is a threaded pin 72, associated with the platform 21, having a threaded part 73 engaging in a threaded bore hole of a nut 76 which is fastened to the drive element 13 as the receptacle 11.

Figure 9:
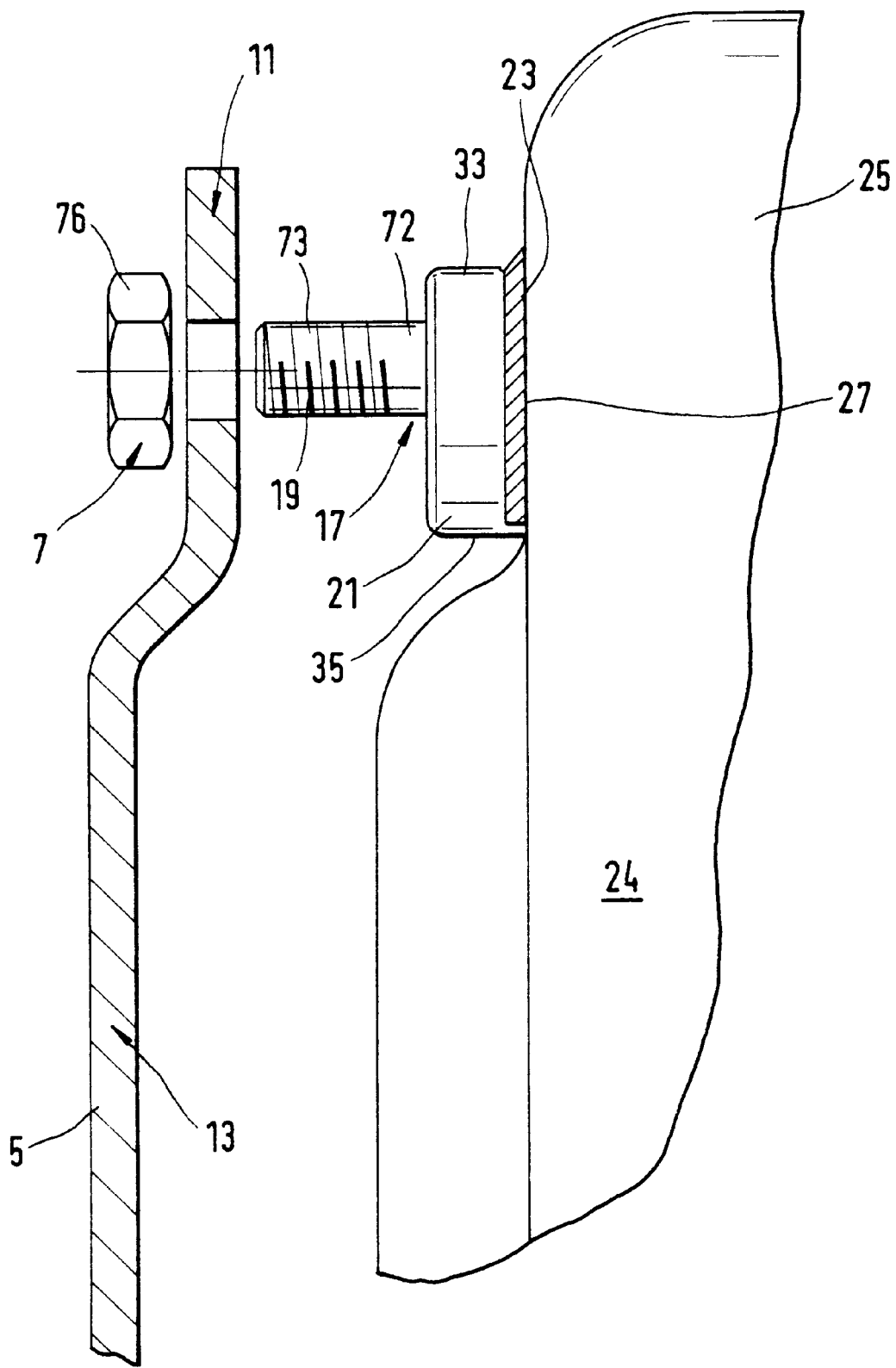
FIG. 9 shows the connection according to FIG. 1, but with a pin at the driver and a threaded sleeve at the drive element.

Advantageously the weld 23 is always produced according to the same welding program as the platform 21 remains the same in all configurations of the driver 17. Even in the event that the platform 21 must be moved radially out of its ideal radial area 27, in which it is shown in FIG. 1 or FIG. 9, in order to arrange it farther outside or inside, only the position coordinates of the welding program are changed, but never the welding program itself. In this way, a heretofore unattained variability is achieved, so that virtually all cases of application in connection with the drive elements 13 can be covered simply by adapting the shape of the driver 17.

The invention is not limited by the embodiments described above which are presented as examples only but can be modified in various ways within the scope of protection defined by the appended patent claims.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A converter housing of a hydrodynamic torque converter, comprising:

a converter cover having a center axis;

a driver having a center axis aligned with the center axis of the converter cover; and a drive having a drive element with a receptacle and a center axis, the driver being arranged in a receiving area at a side of the converter cover facing the drive and being operatively connected to the receptacle of the drive element, the driver having a platform fastened to the converter cover at a predetermined radial distance to the center axis of the converter cover independent of a radial distance of the receptacle to the center axis of the drive element, and a driver member arranged at a side of the platform facing away from the converter cover so as to project toward the drive element, a radial position of the driver member at the platform being determined so that a radial distance of the driver member to the center axis of the converter cover corresponds to the radial distance of the receptacle to the center axis of the converter cover.

2. The converter housing according to claim 1, wherein the drive element is configured so that the receptacle has a greatest radial extension relative to a center axis of the converter housing that forms an enveloping circle, the enveloping circle having a diameter associated with at least one drive of at least one model of motor vehicle, the driver being connectable with the receptacle at the drive element when the enveloping circle is situated within a predetermined radial area.

3. The converter housing according to claim 2, wherein the platform has a radial outer wall arranged at the converter cover, the radial outer wall being situated radially within and at a preselected radial distance from a smallest possible enveloping circle.

4. The converter housing according to claim 3, wherein the converter cover has an axial offset with a radial area, the platform having a radial inner wall that extends radially inward at most to the radial area of the axial offset of the converter cover.

5. The converter housing according to claim 4, wherein the radial outer wall and the radial inner wall of the platform have a shape which at least approximates an associated radius of the converter cover about the center axis of the converter cover.

6. The converter housing according to claim 5, wherein the platform has lateral connecting walls that connect the radial inner wall to the radial outer wall, the radial inner wall having a greater circumferential length than the radial outer wall, so that the lateral connecting walls extend at an angle from the radial outer wall to the radial inner wall, the angle being determined by half of a difference between the circumferential length of the radial inner wall and the radial outer wall.

7. The converter housing according to claim 6, wherein the platform is symmetric in a circumferential direction proceeding from a substantially radial center line extending perpendicular to the center axis of the converter cover.

8. The converter housing according to claim 1, wherein the platform is integral with the driver member.

9. The converter housing according to claim 6, further comprising a weld arranged so as to fasten the platform to the converter cover, the weld extending at least along the radial outer wall and the lateral connecting walls of the platform.

10. The converter housing according to claim 9, further comprising a projection arranged at a side of the platform facing the converter cover so as to define a tacking area for a welding process.

11. The converter housing according to claim 2, wherein the receiving area is substantially flat and contains the radial area, the platform being radially moveable along the predetermined radial area, the platform being welded to the cover outside of the radial area, and the receiving area having a sufficient magnitude in the radial direction so as to allow a welding program to adapt to a new position of the platform by adjustment of position coordinates.

* * * * *